US012711554B2

(12) United States Patent
Huang et al.

(10) Patent No.: US 12,711,554 B2
(45) Date of Patent: Aug. 18, 2026

(54) SYSTEM AND METHOD FOR DYNAMICALLY PREDICTING FRAUD USING MACHINE LEARNING

(71) Applicant: THE TORONTO-DOMINION BANK, Toronto (CA)

(72) Inventors: Xiao Shi Huang, Toronto (CA); Sandra Aziz, Montreal (CA); Juan Felipe Perez Vallejo, Toronto (CA); Jean-Christophe Bouëtté, Montreal (CA); Jennifer Bouchard, Montreal (CA); Mathieu Jean Rémi Ravaut, Toronto (CA); Maksims Volkovs, Toronto (CA); Tomi Johan Poutanen, Toronto (CA); Joseph Pun, Stouffville (CA); Ghaith Kazma, Laval (CA); Olivier Gandouet, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/207,221

(22) Filed: Mar. 19, 2021

(65) Prior Publication Data

US 2022/0300903 A1 Sep. 22, 2022

(51) Int. Cl.

| | |
|---|---|
| ***G06Q 40/08*** | (2012.01) |
| ***G06F 18/214*** | (2023.01) |
| ***G06N 20/00*** | (2019.01) |

(52) U.S. Cl.

CPC ......... *G06Q 40/08* (2013.01); *G06F 18/2148* (2023.01); *G06N 20/00* (2019.01)

(58) Field of Classification Search

None

See application file for complete search history.

(56) References Cited

U.S. PATENT DOCUMENTS 7,861,286 B2 * 12/2010 M'Raihi ............... G06F 21/316 713/186
8,489,476 B1 * 7/2013 Lester ................ G06Q 30/0609 705/35

(Continued)

FOREIGN PATENT DOCUMENTS

CN 109241669 A * 1/2019
WO WO-2021188427 A1 * 9/2021 ........... G06K 9/6256

OTHER PUBLICATIONS

Brownlee, Jason, "Extreme Gradient Boosting (XGBoost) Ensemble in Python", https://machinelearningmastery.com, https://web.archive.org/web/20210116062233/https://machinelearningmastery.com/extreme-gradient-boosting-ensemble-in-python/ Published Nov. 23, 2020, Archived on Jan. 16, 2021 (Year: 2020).*

(Continued)

*Primary Examiner* — Matthew S Gart
*Assistant Examiner* — Mark A Malkowski

(57) ABSTRACT

A computing device configured to communicate with a central server in order to predict likelihood of fraud in current transactions for a target claim. The computing device then extracts from information stored in the central server (relating to the target claim and past transactions for past claims including those marked as fraud), a plurality of distinct sets of features: text-based features derived from the descriptions of communications between the requesting device and the endpoint device, graph-based features derived from information relating to a network of claims and policies connected through shared information, and tabular features derived from the details related to claim information and exposure details. The features are input into a machine learning model for generating a likelihood of fraud in the current transactions and triggering an action based on the (Continued)

likelihood of fraud (e.g. stopping subsequent related transactions to the target claim).

10 Claims, 8 Drawing Sheets

(56) References Cited

U.S. PATENT DOCUMENTS

| | | | | |
|---|---|---|---|---|
| 10,275,522 | B1 * | 4/2019 | Hernandez | G06Q 40/08 |
| 10,515,366 | B1 | 12/2019 | Gorelik et al. | |
| 2008/0005108 | A1 * | 1/2008 | Ozzie | G06F 16/9535 |
| 2011/0078187 | A1 * | 3/2011 | Lim | G06F 16/36 707/E17.014 |
| 2015/0161622 | A1 * | 6/2015 | Hoffmann | H04L 63/20 705/318 |
| 2016/0012544 | A1 * | 1/2016 | Ramaswamy | G06Q 40/08 705/4 |
| 2016/0379309 | A1 * | 12/2016 | Shikhare | G06Q 40/08 705/4 |
| 2017/0061286 | A1 * | 3/2017 | Kumar | G06Q 30/0269 |
| 2018/0060744 | A1 * | 3/2018 | Achin | G06N 5/04 |
| 2018/0204215 | A1 * | 7/2018 | Hu | G06F 21/44 |
| 2018/0254101 | A1 * | 9/2018 | Gilmore | G16H 40/20 |
| 2020/0357196 | A1 * | 11/2020 | Zhang | G06F 18/253 |
| 2021/0019762 | A1 * | 1/2021 | Bosnjakovic | G06N 5/022 |
| 2021/0103580 | A1 * | 4/2021 | Schierz | G06F 16/2365 |
| 2021/0201423 | A1 * | 7/2021 | Speranza | G06Q 10/10 |
| 2021/0390457 | A1 * | 12/2021 | Romanowsky | G06N 5/04 |
| 2021/0406364 | A1 * | 12/2021 | Dasgupta | G06N 5/04 |
| 2022/0044256 | A1 * | 2/2022 | Lakshminarayanan | G06Q 10/10 |
| 2022/0070671 | A1 * | 3/2022 | Muthuswamy | G06K 9/62 |
| 2022/0076164 | A1 * | 3/2022 | Conort | G06N 20/00 |
| 2022/0141235 | A1 * | 5/2022 | Muthuswamy | G06Q 30/0185 726/23 |
| 2022/0172211 | A1 * | 6/2022 | Muthuswamy | G06F 16/9024 |
| 2022/0180211 | A1 * | 6/2022 | Ioannou | G06F 9/3877 |

OTHER PUBLICATIONS

Liang et al, "Uncovering Insurance Fraud Conspiracy with Network Learning", https://dl.acm.org/doi/pdf/10.1145/3331184.3331372 , 2019 (Year: 2019).*

Zsolt Diveki, "Classification with NLP, XGBoost and Pipelines", Kaggle.com, https://www.kaggle.com/code/diveki/classification-with-nlp-xgboost-and-pipelines , Nov. 10, 2018 (Year: 2018).*

Krishana, "XGBoost: What it is, and when to use it", KDnuggets, https://web.archive.org/web/20201227000439/https://www.kdnuggets.com/2020/12/xgboost-what-when.html , 2020 (Year: 2020).*

Wade, Corey, "Hands-On Gradient Boosting with XGBoost and scikit-learn", pp. 86-87, Oct. 2020 (Year: 2020).*

Lundsten, "EALRTS: A predictive regression test selection tool", https://www.diva-portal.org/smash/get/diva2:1376305/FULLTEXT01.pdf , 2019 (Year: 2019).*

Zhao et.al, "DAFEE: A Scalable Distributed Automatic Feature Engineering Algorithm for Relational Datasets", Springer, https://link.springer.com/chapter/10.1007/978-3-030-60239-0_3 (Year: 2020).*

Leonard et. al, "Word Embeddings", https://www.kaggle.com/code/matleonard/word-vectors , Kaggle, (version 16, Sep. 30, 2020) (Year: 2020).*

Dictionary Archivists. Org—"data"—https://web.archive.org/web/20201030190945/https://dictionary.archivists.org/entry/data.html , archived Oct. 30, 2020 (Year: 2020).*

"Link analysis for fraud detection", Ravelin Technology Ltd., https://www.ravelin.com/insights/link-analysis-and-graph-database-for-fraud-detection (accessed Oct. 28, 2020).

* cited by examiner

SYSTEM AND METHOD FOR DYNAMICALLY PREDICTING FRAUD USING MACHINE LEARNING

FIELD

The present disclosure generally relates to a system and method for extracting insights from transaction information via a predictive machine learning model for automatically predicting whether a target claim might be fraudulent for triggering actions or alerts on related computing device(s).

BACKGROUND

Fraudulent claims have been the scourge of service providers in the fields of finance and insurance for decades. As fraud prevention systems evolve, so too do fraud practices. One of the most effective ways to prevent fraudulent claims is to get ahead of them and investigate a potentially fraudulent claim before it gets paid out. The amount of transactions, the various types of transactions, and the number of involved parties that flow through computer systems processing claims makes the problem of fraud detection extremely complex, error prone and time consuming.

Current fraud detection models used to combat fraud are static and unable to grow with the complexities of fraud practices. This is especially problematic when the fraud detection models are provided to an entity by an external vendor without any customization available. In such a case, the black box that shrouds the inner mechanisms of the fraud model makes it nearly impossible to update the model in accordance with growing fraud practices. Also, any such customizations, even if available, occur on a manual basis and thus are error prone and time consuming.

Additionally, existing fraud models are limited in the data reviewed and thus lack a full picture and thereby knowledge of patterns and behaviours which need to be flagged.

There is thus a need for an adaptable and dynamic predictive machine learning model to detect potentially fraudulent claims in a computer network by examining behaviours of electronic transactions in a real-time manner.

SUMMARY

In one aspect, there is provided an improved method of reconciling a number of various features extracted from transaction data related to insurance claim(s) in a predictive machine learning model in order to better predict whether or not a target claim may be fraudulent and result in subsequent actions (e.g. stop subsequent transactions from parties involved with the fraudulent target claim).

In at least some implementations, the proposed solution is meant to provide a quicker and more accurate prediction by using as inputs a diverse feature-set representing for example, claims, claimants, entities, transactions and properties thereof. By using a varied set of inputs, the predictive machine learning model is able to better recreate the scenario of the exposure, and, through a series of predictions created via a gradient boosting algorithm, determine how a fraudulent claimant would behave in the particular scenario of the exposure related to the target claim and, based on this prediction, assess the likelihood that the target claim is fraudulent.

According to one aspect of the present disclosure there is provided a computing device having a processor coupled to a memory and coupled to a central server for detecting a fraudulent transaction in a customer account, the memory storing instructions, which when executed by the processor, configure the computing device to: communicate with the central server to receive an insurance information package comprising current transactions relating to a target claim for a claimant associated with a requesting device as requested from an entity associated with an endpoint device and past transactions for past claims including prior transactions flagged as fraudulent; extract a plurality of sets of distinctive features from the insurance information package comprising: a set of text-based features derived from a plurality of descriptions of communications between the requesting device and the endpoint device when requesting the target claim from the entity, the text-based features describing the target claim; a set of graph-based features derived from the insurance information package relating to all claims, wherein each node identifies: a particular claim selected from the target claim and the past claims; and captures attributes of the node such as attributes defining the particular claim and associated policy (e.g. claim number, date reported, etc.); and each edge links two nodes based on one or more overlapping attributes; a set of tabular features comprising details related to claim information and exposure details of the past claims and the target claim; and, apply the plurality of sets of features as input to a predictive machine learning model trained on the past claims including the prior transactions flagged as fraudulent, to generate a computer signal providing an indication of a likelihood of fraud in the current transactions for the target claim.

In at least some implementations, the computing device further comprises first synthesizing the insurance information package into two distinct tables prior to extracting the set of features: an insurance information table comprising: general insurance information relating to both present and past claimants, claims, and fraud investigations, and; an edge table, consisting of information relating to connections between various claimants connected to the entity.

In at least some implementations, the edge links the two nodes along with a timestamp indicating when a relationship between the two nodes started, the relationship for use by the predictive machine learning model in predicting the likelihood of fraud.

In at least some implementations, the text-based features are derived by automatically translating the descriptions of communication into an array of vectors, wherein a vector of the array is created for each word used in the description and having a number of dimensions, the array of vectors averaged to provide a representation of the entire semantic properties of the description into vector-based features.

In at least some implementations, the description is text-based and the set of text-based features generated further comprise at least one of: a total number of relevant words used in the description, a description length, a number of tokens defining text building blocks.

In at least some implementations, the set of graph-based features generate a network graph and comprises two categories of features: count features representing counts of information associated with a target node of the network graph, the target node being itself a representation of one insurance claimant, within a network of insurance claimant information; and, neighbourhood features comprising information beyond the target node within the network of insurance claimant information comprising a neighbourhood of nodes surrounding the target node.

In at least some implementations, the neighbourhood features are derived via a breadth-first search comprising steps of: gathering information from a set of neighbour nodes immediately connected to the target node; and repeating the gathering in an extended neighbour search for a set of extended neighbour nodes immediately connected to each of the neighbour nodes, and repeating the gathering again until at least a pre-defined number of extended neighbour searches have been performed from the target node.

In at least some implementations, the tabular features are derived from both a current database containing a data store of current policy information for insurance holders associated with an insurance provider, and a legacy database containing a data store of transaction information related to past insurance fraud investigations, and where the tabular features comprise claim-based features.

BRIEF DESCRIPTION OF THE DRAWINGS

These and other features of the disclosure will become more apparent from the following description in which reference is made to the appended drawings wherein.

DETAILED DESCRIPTION

While various embodiments of the disclosure are described below, the disclosure is not limited to these embodiments, and variations of these embodiments may well fall within the scope of the disclosure. Reference will now be made in detail to embodiments of the present disclosure, examples of which are illustrated in the accompanying drawings. Wherever possible, the same reference numbers will be used throughout the drawings to refer to the same or like parts.

Generally, in at least some embodiments, there is provided a computer-implemented system and method for using as inputs a variety of features in order to predict whether a target claim might be fraudulent. Thus, in at least some embodiments, a plurality of features are derived from an insurance information package containing the target claim via a central server comprising a current database and a legacy database which contain current and historical information relating to claims, events, policies, exposures, prior investigations and individual identification information (phone number, addresses, etc.).

Thus, in at least some aspects, the prediction generated by the disclosed systems and methods aims to reduce the amount of time required to identify and investigate potentially fraudulent claims, while also increasing the accuracy of such predictions by examining a plurality of features for the insurance claims. The proposed system and method is advantageous in that it uniquely combines features from a variety of sources, including text-based features, graph-based features, and tabular features, in order to use the features as a broad set of inputs for a predictive machine learning model. Using an array of features as inputs in a predictive machine learning model allows for the disclosed system and method to automatically produce predictions that are more accurate and representative of the dynamic characteristics of a target claim, and also quicker and thus more cost-effective.

In at least some aspects, the disclosed method and system includes utilizing a machine learning model that receives a plurality of types of claims data as input to predict likelihood of fraud. First, a tabular dataset is derived from historical information related to past claims with the entity under investigations as well as transaction information going through the system (e.g. financial transaction and claim information). Second, text features are derived from claim description information gathered at a claim center relating to a specific claim and this is converted from word to vector based features. The vectors capturing semantic properties of the claim description. Third, graph based features show historical claims by way of each node being a claim (or entity or policy) and each edge related to a relationship between the claims. These features are input into the machine learning model to determine likelihood that the data relates to a fraudulent claim.

Figure 1:
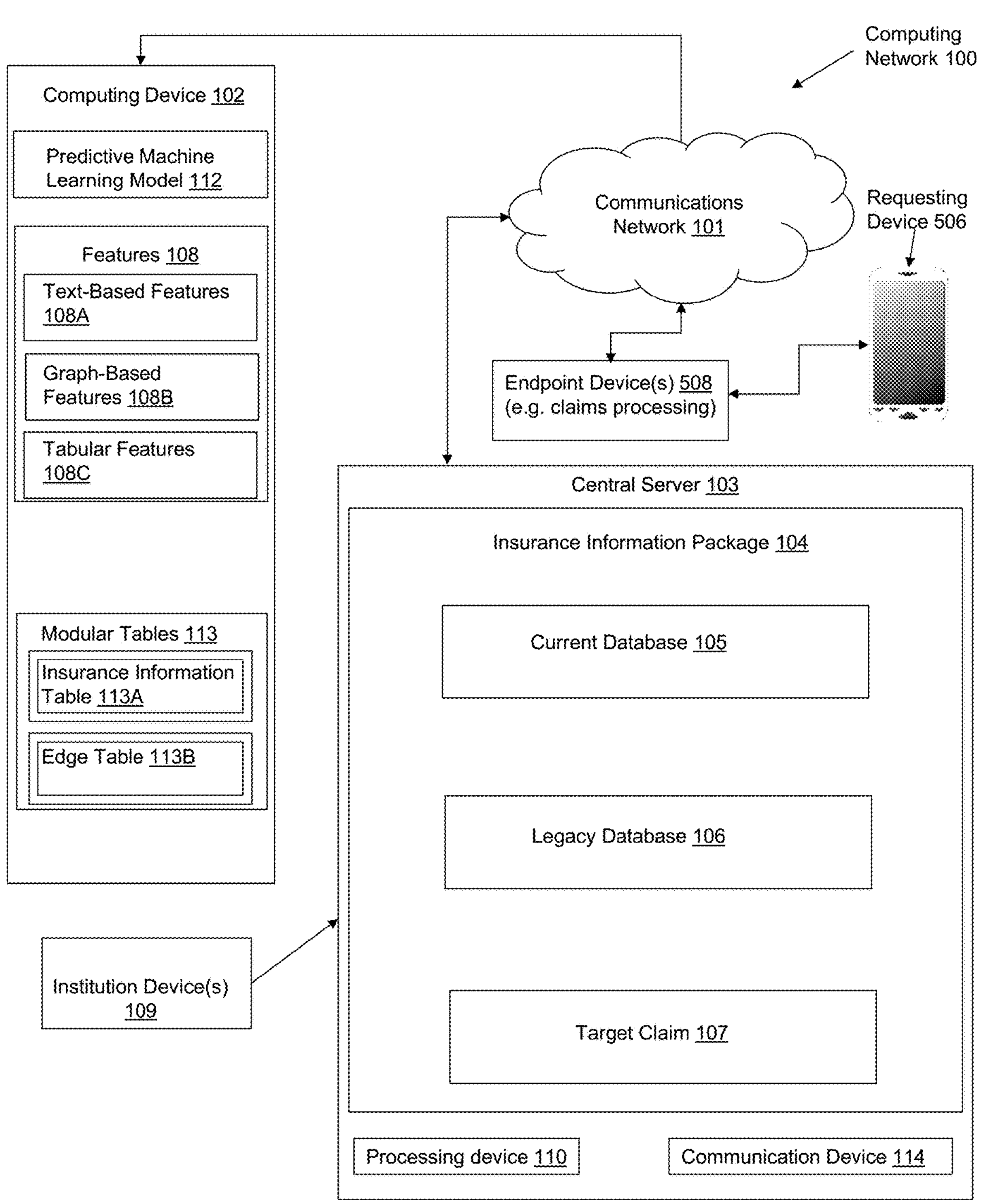
FIG. 1 is a diagram illustrating an example computing device communicating in a communication network and configured to provide an output to dynamically predict whether an insurance claim is potentially fraudulent, in accordance with one or more aspects of the present disclosure.

FIG. 1 is a diagram illustrating an example computing network 100 in which a computing device 102 is configured to communicate, using a communications network 101, with a central server 103. The central server 103 is configured to monitor and store all claim related information including transactions communicated across the computing network 100. Computing device 102 may be configured to receive, from the central server 103 (also may be referred to as a data hub), an insurance information package 104 comprising current transactions relating to a target claim request 107 associated with a requesting device 506 as requested from a claims processing device, such as endpoint device(s) 508. The insurance information package 104 may further comprise past transaction information including past claims in prior transactions flagged as fraudulent. The computing device 102 is then configured to process the insurance information package for determining a likelihood of fraud of the target claim. For example, in at least some implementations, the computing device 102 may be configured to alert affected devices (e.g. endpoint device(s) 508 processing the claims including the target claim and/or requesting device 506) that the target claim is fraudulent and thereby take further action (e.g. deny subsequent transactions from parties associated with the target claim request 107 such as the requesting device 506). In another implementation, the computing device 102 may be further configured to alert the central server 103 of the likelihood of fraud in the target claim such that related transactions and associated entities may be flagged for further investigation.

The central server 103 may further be coupled to one or more institution device(s) 109 for an institution, and contains a current database 105 comprising current transactions including insurance information relating to current claims, policies, claimants and/or related activities (e.g. policy snapshots, financial transaction information, claim information, etc.), and a legacy database 106 that consists of information relating to past transactions for past claims including past insurance fraud investigations, as well as the claims and claimants involved in the investigations and the success of the investigations. The central server 103 communicates this insurance information in the form of the insurance information package 104 to the computing device 102 via the communications network 101 for subsequent processing.

The computing device 102, upon receiving the insurance information package 104 which also contains relevant information relating to the target claim request 107, processes the information to derive a set of features 108 from both current and past information, which are then used as inputs in a predictive machine learning model 112 in order to create a prediction of the likelihood of fraud, e.g. whether a claimant connected to the target claim request 107 might have submitted a fraudulent claim. As will be described further with reference to FIGS. 5-7, the features 108 are derived from the current database 105 and the legacy database 106 in the form of a set of text-based features 108A, graph-based features 108B, and/or tabular features 108C.

The features 108 are all used as inputs in the predictive machine learning model 112 in order to create a prediction as to the potential fraudulence of the target claim request 107. Conveniently, in at least some aspects, the breadth of data that the computing device 102 is able to process as inputs for the predictive machine learning model 112 leads to improved accuracy and prediction and dynamically allows real-time feedback of whether fraud is detected. Combining text-based features 108A, graph-based features 108B, and tabular features 108C allows for a more thorough and reliable prediction resulting from the predictive machine learning model 112.

Figure 5:
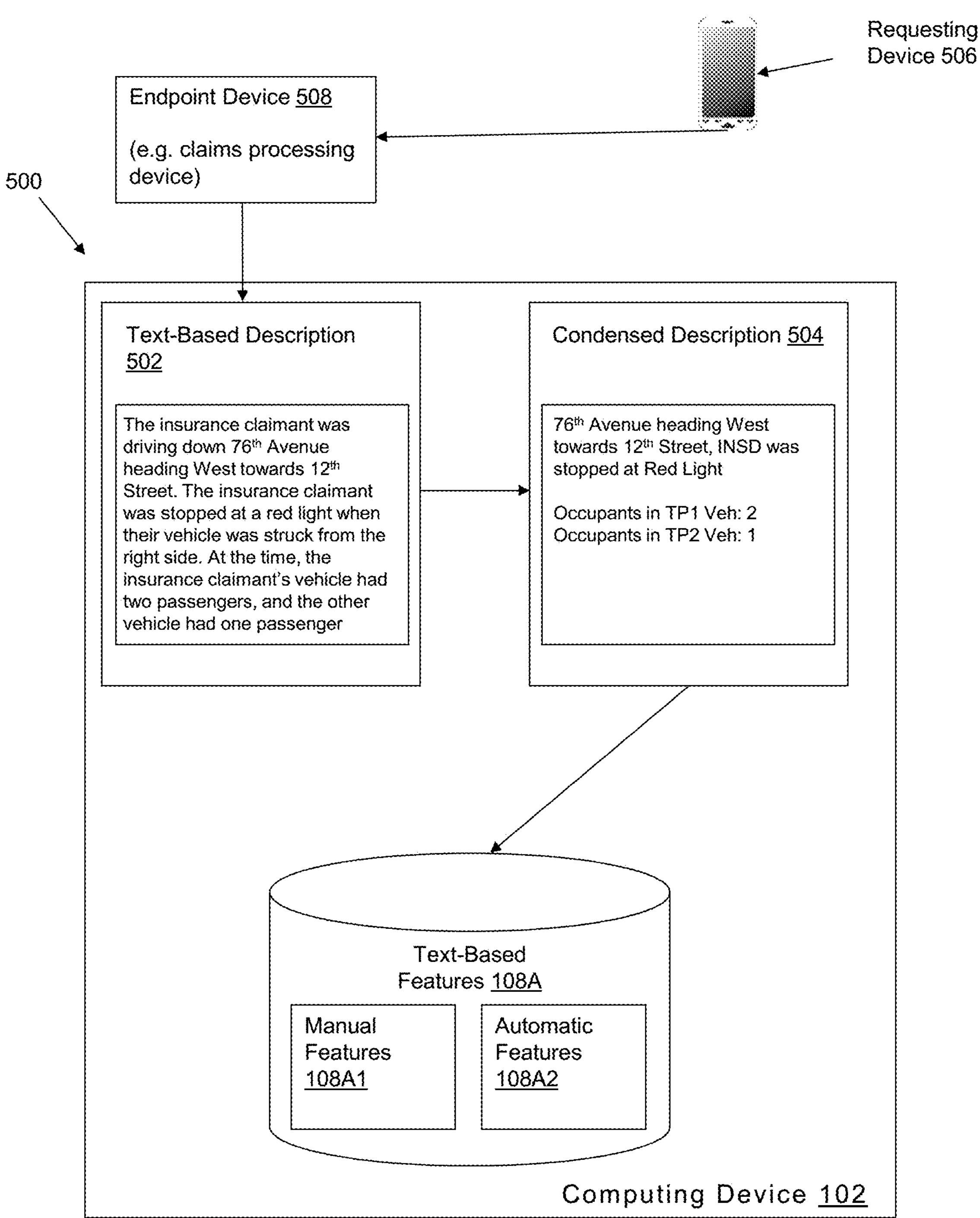
FIG. 5 is a flowchart illustrating example operations of portions of the computing device of FIG. 1 in communication with the endpoint device and the requesting device of FIG. 1 for generating text-based features, in accordance with one or more aspects of the present disclosure.

In one example, the target claim request 107 may involve a vehicle insurance policy and an exposure related to a vehicle collision. The creation of target claim request 107 may involve communications, as shown in FIG. 5, between a requesting device 506 and the entity via an endpoint device 508, wherein the information communicated between the requesting device 506 to the entity via the endpoint device(s) 508 for claims receiving, processing and/or adjudication may be stored in the current database 105 within the central server 103. The central server 103 may communicate this information, as part of the insurance information package 104, to the computing device 102.

In at least some implementations, the computing device 102 first converts the information received in the insurance information package 104 into a set of modular tables 113 stored on the computing device 102 from which the features 108 stored on the computing device 102 can be extracted. Converting the information in the insurance information package 104 via the computing device 102, may involve distilling the information received from the current database 105 and the legacy database 106 into an insurance information table 113A and an edge table 113B. All of the information in the current database 105 related to claims and claimants is distilled into the insurance information table 113A, as well as information from the legacy database 106 related to past fraud investigations including the claims associated with those investigations and the outcome of those investigations. The edge table 113B receives information from the current database 105 related to the connections (e.g. known or determined relationships) between various claims, policies, and entities related to the institution. An example process by which the information in the insurance information package 104 is converted into the modular tables 113 is explained further in FIG. 4.

In at least some implementations, once the information from the insurance information package 104 has been processed into the modular tables 113, the computing device 102 may then automatically extract relevant features 108 from the modular tables 113.

The computing device 102 is configured to automatically extract the features 108 from information received via the current database 105 and the legacy database 106 using a plurality of computer implemented processes that create a plurality of unique sets of features 108. The text-based features 108A are extracted from the insurance information table 113A, and this process involves analyzing and creating features based on communications between the requesting device 506 and the endpoint device 508. The process by which the text-based features 108A are extracted from the communications between the requesting device 506 and the endpoint device 508 is explained in more detail in FIG. 5.

In the example of the target claim request 107 relating to an exposure involving a vehicle collision, the information in the communication between the requesting device 506 and the endpoint device 508 may involve descriptions (e.g. text, audio, video, speech) relating to the loss caused by the accident, any injuries related to the accident, the fault rating of the target insurance claimant, etc. All of these fields are unique to the event that took place and are included in the text-based features 108A.

In another example, the target claim request 107 may contain claim information in relation to a home insurance policy where the exposure involved damage to the home of the claimant associated with the target claim request 107. In this case, the attributes or fields in the target claim request 107 are specific to the communication between the requesting device 506 and the endpoint device 508 and may involve, depending on the specific exposure, loss due to theft, loss due to water damage, loss due to fire, etc. All of these different fields impact the text-based features 108A that are ultimately extracted from the current database 105, and allows for a more customized prediction from the predictive machine learning model 112.

Graph-based features 108B may be extracted directly from the insurance information package 104 and/or from the insurance information table 113A and from the edge table 113B. The process by which graph-based features 108B are extracted involves first creating a network of claims, policies, and entities relating to a particular claim, e.g. the target claim request 107, where each entity is a piece of information relating to a claim or policy such as identification information for the person(s) involved, a phone number, an email address, contact address, vehicle identification information, etc. Having created a network of connected information surrounding the target claim request 107, the computing device 102 is then configured to extract information relating to the specific number of claims, policies, or various entities included in the network, the degree of connections between various claims, policies, or entities in that network, the percentage of the network that are claims, etc. The process by which the computing device 102 extracts graph-based features 108B from a graph network surrounding the target claim request 107 is explained in more detail in FIG. 6.

Figure 6:
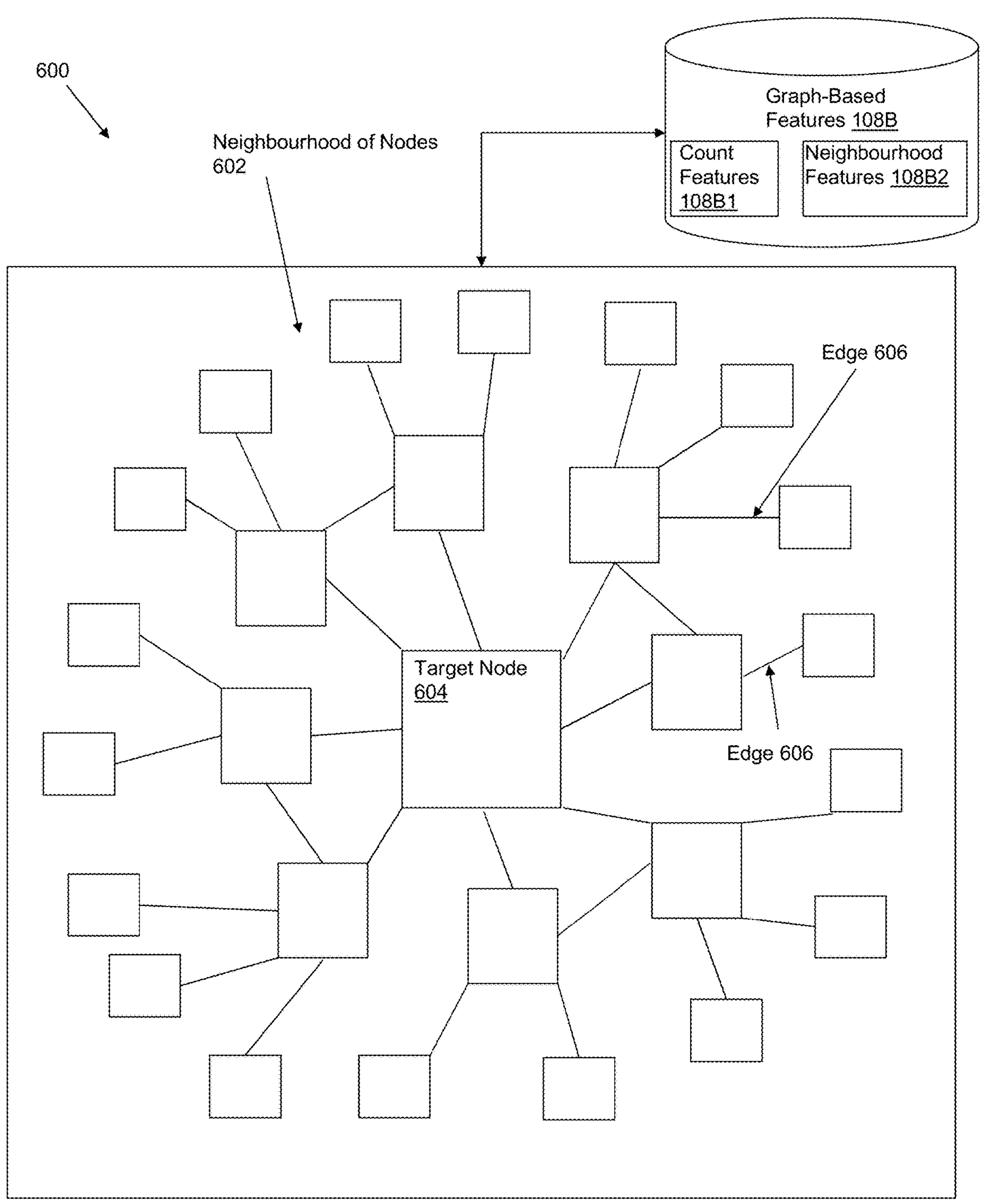
FIG. 6 is a flowchart illustrating example operations of portions of the computing device of FIG. 1 for generating graph based features, in accordance with one or more aspects of the present disclosure.

In an example of the target claim request 107 relating to an exposure involving a vehicle collision, the computing device 102 is configured to generate a graph network of claims or policies and related entities stemming from the target claim request 107 (see also FIG. 6). The claims and/or policies defined at each node (e.g. within neighbourhood of nodes 602 in FIG. 6) may be connected via shared entities (e.g. person identification, phone number, email address, contact address, vehicle information), or else otherwise connected directly or indirectly via other common attributes (e.g. overlapping source accounts related to the claim, related email address, overlapping claimant information, overlapping policy information, overlapping events, etc.). Graph-based features 108B extracted via the computing device 102 may further include how many of the entities connected to the target claim request 107 within the graph network are phone numbers created in the past year. Another graph-based feature 108B that may be extracted is the maximum number of claimant entities that are connected to the target claim request 107.

The computing device 102 is further configured to extract tabular features 108C from the insurance information table 113A. Tabular features 108C include data characterizing the target claim request 107 such as information relating to the claim itself, to the exposure, and to a set of pre-defined features generated from computing analysis on the claim and exposure information. The process by which tabular features 108C are extracted and calculated from the metadata of the target claim request 107 is explained in more detail in FIG. 7.

In the example of a target claim request 107 relating to an exposure involving a vehicle collision, tabular features 108C extracted might include features relating to the value of the claim, the severity of the incident, and the number of days from which the exposure occurred to when the claim was made.

In the example of FIG. 1, the central server 103 is an example of a computing device having at least one processing device 110 (e.g. a processor), a communication device 114 coupled to at least one processing device 110 and at least one memory (e.g. a storage device, not shown) having data stores and data comprising current database 105, legacy database 106, target claim request 107, insurance information package 104, and instructions which, when executed by the processing device 110 configure the central server 103 to perform computing operations, including those disclosed herein and communication with the computing devices shown in FIG. 1.

The communications network 101 may comprise a wide area network (WAN) such as the Internet. It is understood that the communications network 101 is simplified for illustrative purposes. The communications network 101 may comprise additional networks coupled to the WAN such as a wireless network and/or local area network (LAN) between the WAN and the computing device 102, central server 103, requesting device 506, endpoint device(s) 508, and institution device(s) 109.

Figure 2:
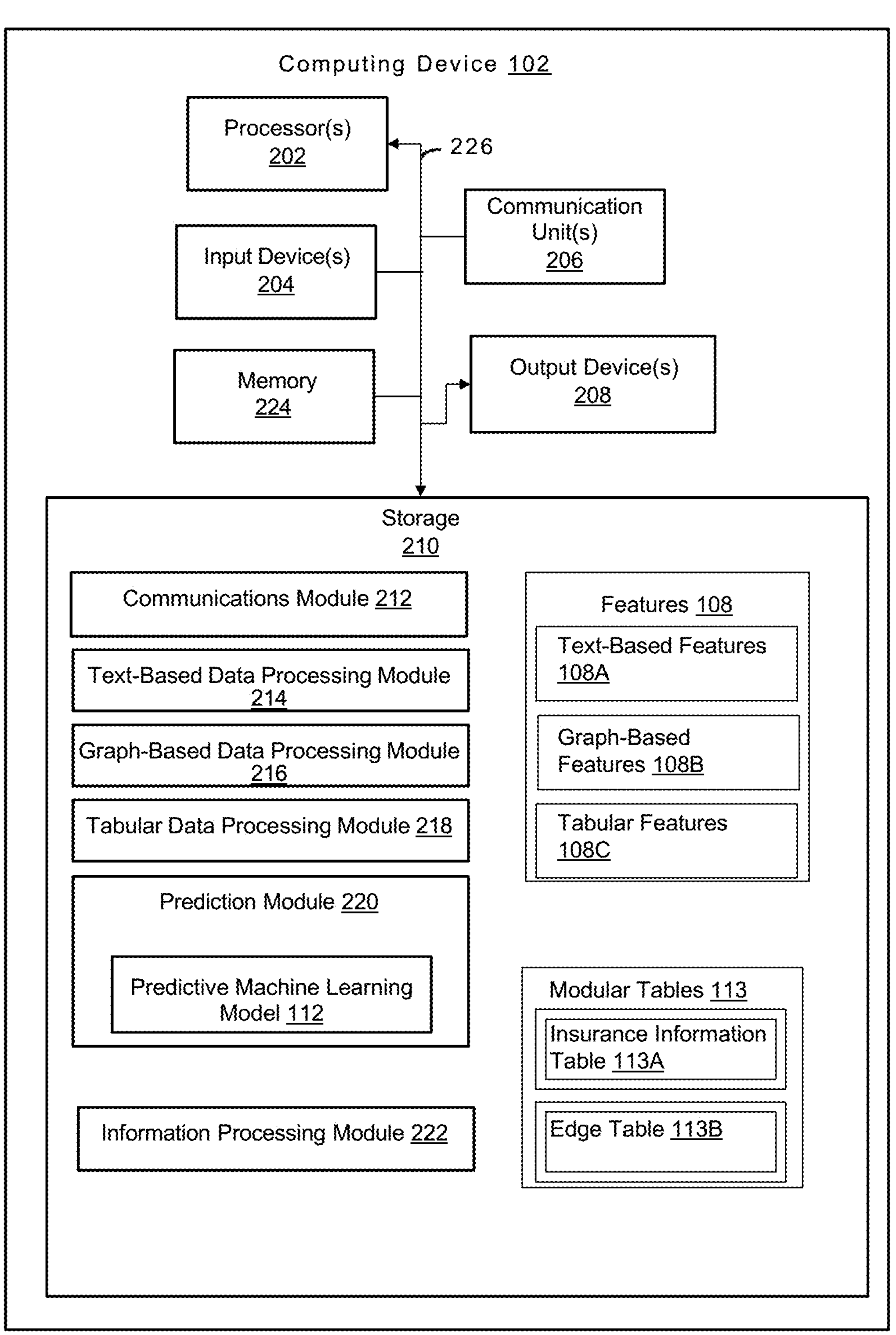
FIG. 2 is a diagram illustrating in further detail the example computing device of FIG. 1, in accordance with one or more aspects of the present disclosure.

FIG. 2 is a diagram illustrating in block schematic form an example computing device (e.g. the computing device 102 shown in FIG. 1), in accordance with one or more aspects of the present disclosure, for example to provide a computer implemented system to extract and generate a number of features 108 from the metadata provided in the insurance information package 104 (e.g. containing data characterizing current and past claims, associated individuals, phone numbers, addresses, etc.). The features 108 comprise text-based features 108A, graph-based features 108B, and tabular features 108C, and these features 108 are then provided to the predictive machine learning model 112 in order to produce a prediction as to whether the target claim request 107 might be fraudulent. In at least some aspects, this unique combination of features 108 conveniently allows improved computing speed and accuracy of prediction as it provides thorough and varied data characterizing current and past claims from which the predictive machine learning model 112 is configured to base its prediction thereon.

The computing device 102 comprises one or more processors 202, one or more input devices 204, one of more communication units 206 and one or more output devices 208. The computing device 102 also includes one or more storage devices 210 storing one or more modules such as communications module 212 configured for communicating insurance information between the central server 103 and the computing device 102, text-based data processing module 214 for deriving relevant feature information from the text-based insurance data, graph-based data processing module 216 for deriving features from the graph-based data, tabular data processing module 218 for deriving features from the tabular data, and prediction module 220 for using the inputted figures in order to create a prediction based on the features of the target claim request 107. The communication channels 226 may couple each of the components including the processor(s) 202, the input device(s) 204, the communication unit(s) 206, the output device(s) 208, the storage device(s) 210, the communications module 212, the text-based data processing module 214, the graph-based data processing module 216, the tabular data processing module 218, the prediction module 220 and the information processing module 222 for inter-component communications, whether communicatively, physically and/or operatively. In some examples, the communication channels 226 may include a system bus, a network connection, an inter-process communication data structure, or any other method of communicating data.

One or more of the processors 202 may implement functionality and/or execute instructions within the computing device 102. For example, the processors 202 may be configured to receive instructions and/or data from the storage device 210 to execute the functionality of the modules shown in FIG. 2, among others (e.g. operations system, applications, etc.). The computing device 102 may store data/information to the storage devices 210. Some of the functionality is described further herein below.

One or more of the communication units 206 may communicate with external computing devices and servers (e.g. the central server 103, endpoint devices 508, requesting device 506 and institution devices 109 in FIG. 1) via one or more networks (e.g. the communications network 101 in FIG. 1) by transmitting and/or receiving network signals on the one or more networks. The communication units 206 may include various antennae and/or network interface cards, etc., for wireless and/or wired communications.

The input devices 204 and the output devices 208 may include any of one or more buttons, switches, pointing devices, cameras, a keyboard, a microphone, one or more sensors (e.g. biometric, etc.), a speaker, a bell, one or more lights, etc. One or more of same may be coupled via a universal serial bus (USB) or other communication channel (e.g. 220).

The one or more storage devices 210 may store instructions and/or data for processing during operation of the computing device 102. The one or more storage devices 210 may take different forms and/or configurations, for example, as short-term memory or long-term memory. The storage devices 210 may be configured for short-term storage of information as volatile memory, which does not retain shared contents when power is removed. Volatile memory examples include random access memory (RAM), dynamic random access memory (DRAM), static random access memory (SRAM), etc. The storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Referring to FIGS. 1 and 2, the communications module 212 may be configured to receive from the central server 103 the insurance information package 104. Upon receiving this package, the text-based data processing module 214, the graph-based data processing module 216 and the tabular data processing module 218 may extract and/or generate from the information communicated via the insurance information package 104 the features 108 (e.g. 108A, 108B, and 108C) respectively. Having derived the features 108 from the insurance information package 104, the prediction module 220 utilizes a trained predictive machine learning model 112 (e.g. previously trained on prior insurance claim data classified as fraudulent or not) to perform predictions. That is, the combination of all of the features 108 are provided as inputs to the predictive machine learning model 112 (e.g. having been previously trained via one or more historical features 108 for prior transactions) in order to automatically determine whether there is a possibility that the target claim request 107 might be fraudulent. In at least some aspects, the predictive machine learning model utilizes historical data to train the model based on prior transactions marked as fraud to provide a prediction of how a fraudulent claimant might interact with the computing network 100 in the particular scenario of events found in the target claim request 107.

In at least some implementations, in response to the insurance information package 104 being communicated to the computing device 102, the information processing module 222 breaks down the data in the insurance information package 104 into two modular tables 113 to be used for subsequent feature extraction via the feature extraction modules, e.g. text-based data processing module 214, graph-based data processing module 216, and tabular data processing module 218. The information within the insurance information package 104 contains data (e.g. all or a subset of data relevant to the target claim request 107) from the current database 105 and the legacy database 106. The information received from the current database 105 and the legacy database 106 is used to generate, via the information processing module 222, the insurance information table 113A, which contains general insurance information relating to both present and past claimants, claims, entities (e.g. person identification, phone number, contact address, email address, vehicle information and policy information); fraud investigations and the edge table 113B which contains information relating to relationships and underlying connections between various data in the insurance information table 113A, including connections (e.g. entity overlaps) between claimants connected to a party from which a claim is being requested.

In at least some implementations, the text-based data processing module 214 operates by first receiving the insurance information package 104 from the central server 103. The text-based data processing module 214 uses the data contained in both the current database 105 and the legacy database 106 to generate the text-based features 108A.

The current database 105 may comprise claim information, policy snapshots (e.g. coverages, endorsements, etc.), financial transaction information, etc. The legacy database 106 may comprise information relating to all claims previously investigated and/or flagged as fraudulent, and results of the investigations.

Specifically, in at least some aspects, text-based features 108A are derived from the information relating to the communication (e.g. audio, voice, message, text, etc.), as shown in FIG. 5, between the requesting device 506 and the endpoint device 508 when submitting and/or updating a particular claim, e.g. in relation to the target claim request 107. The communication may initially be automatically converted into a text-based description 502. This text-based description 502 is preferably stored in the current database 105 and communicated to the computing device 102 as part of the insurance information package 104.

As will be explained in detail in FIG. 5, the text-based data processing module 214 may extract from the text-based description 502 relevant features (e.g. such features may be dynamically defined based on historical learning of relevant features) relating to count aspects of the text-based description 502 such as the number of tokens, the number of relevant words, and the description length etc. The text-based data processing module 214 may also extract from the text-based description 502 a tokenized version of the text-based description 502. This tokenized version contains semantic information about the text-based description 502. The text-based data processing module 214 may produce as part of the text-based features 108A both the count aspects and the semantic information derived from the text-based description 502.

The graph-based data processing module 216 relies on data from the current database 105 as well as the legacy database 106 provided in the insurance information package 104 communicated to the computing device 102. Within the current database 105 is information that may relate to a set of transactions, policy information and/or claim related information. The current database 105 may further characterize a plurality of insurance claims, policies (e.g. coverages, endorsements, client loyalty period), financial transaction information, and entities. The current database 105 may further comprise identification information where the target claim request 107 may be represented when the information is converted to a graph network, as shown in FIG. 6, as a target node 604. The target node 604 situated in a network of nodes (e.g. neighbourhood of nodes 602) whereby it is surrounded by other claims, policies and entities that are also each represented as nodes in the network. The graph-based data processing module 216 is configured to generate connections between the associated nodes within the network of nodes based on claims and/or policies that have entities or other identification information (e.g. email address, phone, etc.) in common.

For example, each node represents a claim or a policy, etc., and can have attributes such as claim number, date reported, and other claim or policy identification information. These connections are instantiated in the form of edges 606, as shown in FIG. 6. In this manner, in at least one aspect, the claims and policies are merged to the different types of entities (e.g. person, phone number, address, email, vehicle identification, etc.). Entities that claims or policies may have in common such that an edge 606 will be created between that claim or policy and the other claim or policy include the address associated with the claim or policy, an individual associated with the claim or policy, a phone number associated with the claim or policy, etc. Edges 606 contain information that becomes part of the graph-based features 108B in the form of date/time stamps of when the edge 606 was created (e.g. when was the relationship connecting two associated claims formed). The resulting network of nodes, consisting of the target node 604 connected to the surrounding nodes via edges 606 is referred to as a neighbourhood of nodes 602, as shown in FIG. 6.

The graph-based data processing module 216, having created the neighbourhood of nodes 602 from the information contained in the current database 105 and the legacy database 106, then performs a breadth-first search in order to gather information from those nodes closely connected to the target node 604. The resulting span of nodes that are captured in the breadth-first search represents the nodes from which information will be extracted as graph-based features 108B.

In at least some aspects, graph-based features 108B are thus derived from the insurance information package 104 relating to all claims (e.g. current claims as stored in the current database 105 and/or past claims as stored in the legacy database 106) and each node in the neighbourhood of nodes 602 identifies one of the claims (e.g. either target or past claims) or policies and associated characteristics (e.g. attributes of the particular claim shown in the node and the associated policy, such as claim number, date reported, etc.). As described above, each edge 606 connecting two nodes links the nodes based on one or more overlapping attributes between the nodes and may also include a timestamp of the edge formation linking the relationship. In this way, each edge 606 may link claims to claims and policies to claims with a goal to merge claims and policies to the different entities (e.g. person, phone number, address, email, and vehicle).

In at least some aspects, the graph based features 108B may further include, as shown in FIG. 6, count features 108B1 that are extracted from the neighbourhood of nodes 602 and include, for example, information such as total amount of nodes within the neighbourhood of nodes 602, and the number of individuals or accounts associated with a given claim within the neighbourhood of nodes 602. Graph-based features 108B may also include neighbourhood features 108B2 that include, for example, the percentage of nodes in a neighbourhood that are claims (e.g. versus entities), whether or not a node is related to a past fraudulent claims investigation, etc.

Referring to FIGS. 1, 2 and 6, the tabular data processing module 218 is configured to derive tabular features 108C from the information contained in both the current database 105 and the legacy database 106 (e.g. as provided in the information package 104). Tabular features 108C contain data characterizing the claim, the exposure, and other information derived from automatic pre-defined calculations performed on and between the claim and exposure information. For example, the computing device 102 may be configured to perform additional pre-defined analysis on the target claim request 107 based on determining characteristics of the target claim request 107 (e.g. from the current database 105) and whether prior transactions as stored in the legacy database 106 having been flagged as fraudulent having similar characteristics to the target claim request 107 have been associated with certain pre-defined analysis for additional insights. That is by determining the characteristics of the target claim request 107, the tabular features 108C may perform pre-defined analysis on the target claim request 107 to compare it to the prior claims as stored in the legacy database 106.

In one example, where the target claim request 107 is related to an automobile accident, the tabular features 108C derived via the tabular data processing module 218 that may be related to the claim include whether consent was given, the claim value, the fault rating of the insurance claimant, whether the vehicle was towed, and what coverage is in question. In this same example, the tabular features 108C derived based on the exposure might include the severity of the incident, and the total loss. Other factors that the tabular data processing module 218 may process and extract as tabular features 108C include the number of delay days reported between the time of the accident and the time that the target claim request 107 was created, the number of passengers in the vehicle at the time of the automobile collision, and whether the driver of the vehicle in question was on the insurance policy in question.

In another example, the target claim request 107 may be related to a stolen vehicle rather than an automobile accident. In this case, the tabular features 108C extracted based on the exposure may include data characterizing the insight that the vehicle was stolen and the total loss associated with the theft.

Referring again to FIG. 2, once all of the features 108 have been extracted from the data contained in the insurance information package 104, the prediction module 220 is configured to then use the features 108 (e.g. text-based features 108A, graph-based features 108B, and tabular features 108C) as inputs to a predictive machine learning 112, previously trained (e.g. using historical data regarding claims/entities marked as fraudulent or not). Preferably, the predictive machine learning model 112 utilizes a gradient boosting algorithm. Further preferably, the model implements gradient boosted decision trees. In at least some implementations, the predictive machine learning model 112 further comprises an extreme gradient boosting model, XGBoost, an implementation of gradient boosting machines which conveniently provides improved computational speed (e.g. execution speed) and model performance. The extreme gradient boosting model utilizes gradient boosting decision tree processes. Gradient boosting generates new models to predict residual errors of prior implemented models and the residuals are added together to make a final prediction of the model. The model is configured to minimize the loss in the residuals for the new models. In at least some implementations, the XGBoost may be implemented in major programming languages including C, C++, Python, R, Java, Scala and Julia. Put another way, XGBoost process is a decision based ensemble machine learning algorithm using a gradient boosting framework whereby each decision tree may be trained sequentially, with each new tree trained on the residuals of the previous trees. Conveniently, in at least some aspects, using XGBoost for the predictive machine learning model 112 provides hardware and software optimization for improved computing performance by utilizing less computing resources (e.g. including hardware optimization by optimizing disk space usage).

Using the features 108 as input to the predictive machine learning model 112, the predictive machine learning model 112 predicts whether the target claim request 107 might be fraudulent (e.g. by classifying the claim as fraudulent or not). The prediction module 220 utilizes the predictive machine learning model 112 and is able to produce an accurate and expedient prediction by producing a plurality of decision tree-based decisions (e.g. each new decision tree being trained on the residuals of the previous trees) based on the historical and current information inputted via the features 108. The results of the plurality of decision tree decisions are applied to generate an accurate and dynamic prediction of fraud using a variety of types of input data features.

It is understood that operations may not fall exactly within the modules (e.g. communications model 212; text-based data processing model 214; graph-based data processing module 216; tabular data processing module 218; prediction module 220; predictive machine learning model 112; and information processing module 222) of FIG. 2 such that one module may assist and/or overlap with the functionality of another.

Figure 3:
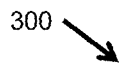
FIG. 3 is a flowchart illustrating example operations of the computing device of FIG. 1, in accordance with one or more aspects of the present disclosure.
Figure 3:
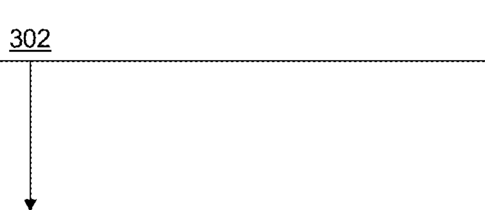
Figure 3:
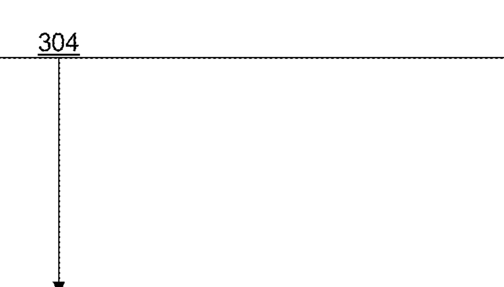

FIG. 3 is a flowchart of operations 300 performed by a computing device, such as the computing device 102 illustrated in FIGS. 1 and 2. As described in relation to FIG. 2, the computing device 102 comprises at least one processor 202, configured to derive from a breadth of insurance related claim information generated via communications between various computing entities (e.g. a claimant associated with the requesting device 506 and a claim processing device such as endpoint device 508), three distinct types of features 108 (e.g. defining claims, individuals involved, phone numbers, addresses, etc.). The features 108 comprise: text-based features 108A, graph-based features 108B, and tabular features 108C, and are provided as inputs in a predictive machine learning model 112 in order to produce an accurate and timely prediction as to whether the target claim request 107 might be fraudulent.

Figure 4:
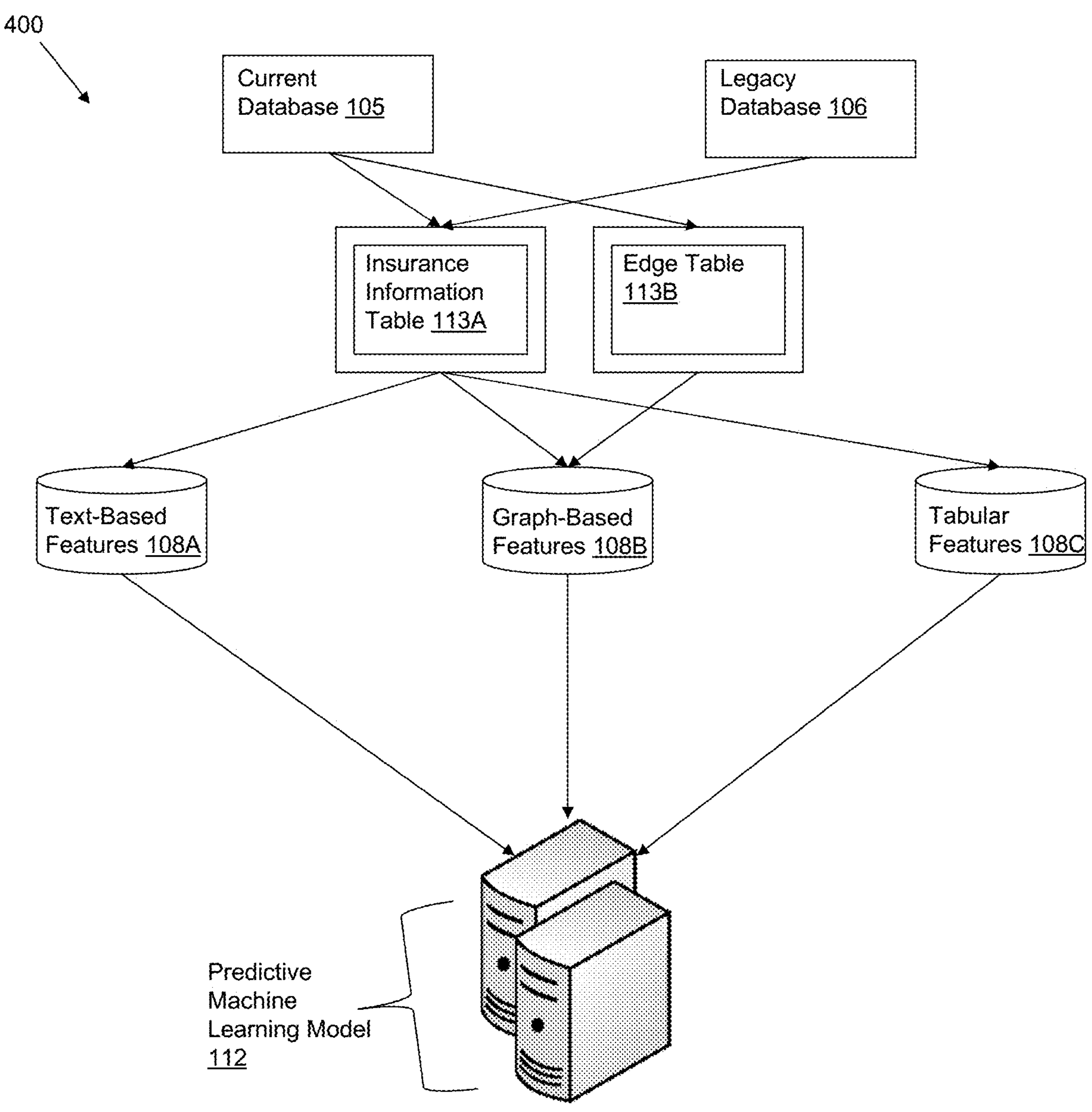
FIG. 4 is a flowchart illustrating example operations of the computing device of FIG. 1, in accordance with one or more aspects of the present disclosure.

Referring to FIGS. 3 and 4, at 302, operations instruct the computing device 102 to communicate with the central server 103 illustrated in FIG. 1 in order to receive the insurance information package 104 from the central server 103. The central server 103 being connected to one or more institution devices 109 for the institution (e.g. containing account and policy information) and/or endpoint devices 508 (e.g. for receiving and processing claims associated with the institution devices 109) that have access to a breadth of information related to current and past data characterizing claims, claimants, entities involved and fraudulent claim investigations. Included in the insurance information package 104 are data retrieved from two databases: the current database 105 illustrated in FIG. 1 and the legacy database 106 illustrated in FIG. 1. The current database 105 contains a store of transaction, claim and policy information for account holders associated with an entity, such as an insurance provider. The legacy database 106 contains a store of transaction information related to past insurance fraud investigations (e.g. all claims investigated and/or previously marked as fraudulent and results of investigations). Also included in the insurance information package 104 is information relating to the target claim request 107, this being the claim that will be the subject of the fraud prediction that is the output of the computing device 102.

In at least some aspects, having received the insurance information package 104, the computing device 102 synthesizes the information contained in the current database 105 and the legacy database 106 into two modular tables 113 from which the features 108 will be extracted. These tables include the insurance information table 113A illustrated in FIG. 1, and the edge table 113B illustrated in FIG. 1. As also shown in FIG. 4, the insurance information table 113A extracts data from both the current database 105 and the legacy database 106, and contains data relating to current and past claims, current and past claimants, and current and past fraudulent claims investigations. The edge table 113B extracts information related to policy and claims in the current database 105, and contains information relating to the connections, or edges 606, as shown in FIG. 6, between various different claims, claimants, policies, and policy holders. The process by which the edges 606 are formed is described in further detail in FIG. 6. Edges 606 are automatically created whenever a claim shares overlapping information or attributes with a policy, or whenever a claim or policy can be connected to an entity, an entity being information found in those claims and policies such as a phone number, an email address, a vehicle VIN number, etc.

At 304, operations of the computing device 102 extract from the insurance information package 104 (e.g. which may be further broken down into the insurance information table 113A and the edge table 113B as described above) a set of distinct features 108 to be used as inputs in the predictive machine learning model 112. The features 108 comprise three distinct sets, the text-based features 108A, the graph-based features 108B, and the tabular features 108C.

In at least some aspects and referring to FIGS. 3, 4, and 5, at 304, text-based features 108A may be derived from a plurality of text-based descriptions 502 (e.g. via text-based data processing module 214) as illustrated in FIG. 5 of communications between the requesting device 506 and the endpoint device 508. The communications may include for example communications generated relating to a target claim via, messaging applications, telephone communications, contact and calendar applications, web browsing applications, financial, payment and other applications or functions for submitting, updating, reviewing and/or revising claims for a user associated with the requesting device 506 and submitting the claim to the endpoint device 508 for subsequent processing. The text-based features 108A may further comprise: manually pre-defined features 108A1 illustrated in FIG. 5, and automatically generated features 108A2 illustrated in FIG. 5. Text-based features 108 may be derived from the computing device 102 automatically analyzing the text-based description 502 (e.g. description of a target claim inquiry received from the requesting device 506) in order to determine aspects such as the number of tokens, the number of words relevant to the claim at issue, the length of the description, etc. The text-based features 108A may further be derived from the computing device 102 automatically translating the text-based description 502 (e.g. see an example text based description in FIG. 5) into an array of vectors, where a respective vector is created for each word (or each relevant word) used in the text-based description 502 and each vector is composed of a number of dimensions. Each vector may capture the semantic properties of the word that the vector represents, such that when an average of the dimensional properties of the vector is automatically performed by the computing device 102, a representation of the entire semantic properties of the text-based description 502 is created in the form of the vector-based features that comprise the automatic features 108A2 (e.g. generated using text mining).

In one example, a sentence in the text-based description 502 may be "all roads lead to Rome". In this example, the computing device 102 may be configured to automatically convert that word sentence into a vector representation, for example "0.1, 2.3, −1.2". The automatic features 108A2 extracted therefrom would be the semantic vector representation "0.1,2.3,−1.2", while the manual features 108A1 extracted would be that the number of words="5", and the language is English which is represented as "1,0", etc. Thus, the text-based features 108A extracted (e.g. may be in the form of vector) from this sentence then would be the example vector "0.1,2.3,−1.2,5,1,0".

Referring to FIGS. 3, 4 and 6, the graph-based features 108B derived at step 304 are extracted (e.g. via the graph based data processing module 216 of FIG. 2) from the insurance information package 104. Specifically, the graph-based features 108B are derived from the insurance information table 113A relating to both present and past claimants, claims and fraud investigations, and the edge table 113B relating to connections between various claimants associated with or having accounts on the institution device(s) 109 (e.g. see also FIG. 2). Graph-based features 108B may be extracted in two forms: as count features 108B1 and as neighbourhood features 108B2. When extracting graph-based features 108B, the information is presented in the form of a network of nodes, where each node represents a current claim or past claim or policy as retrieved from the current database 105, as well as entities that are distinct pieces of information connected to claims or policies, including phone numbers, email addresses, individuals, etc. These nodes are connected by the edges 606 when the underlying claims, policies, or entities have one or more overlapping characteristics. The resulting graph of connected nodes is referred to as the neighbourhood of nodes 602 shown in FIG. 6.

In at least some aspects, prior to the graph-based features 108B being extracted, the computing device 102 automatically performs a breadth-first search, whereby the network of nodes from which information will be extracted as part of the graph-based features 108B is restricted within the neighbourhood of nodes 602, as shown in FIG. 6. The breadth-first search operates by gathering information first from those nodes directly connected to the target node 604, then to the nodes directly connected to those nodes, and expanding out until a pre-defined amount of layers have been included in the network from which the information will be extracted. In one example, the pre-defined number of layer of expansion from the target node 604 may be five layers. In this example, there may be a neighbourhood of nodes 602 consisting of 200 nodes, each being either a claim, a policy, or an entity, and all being variously connected to at least one but potentially many other nodes, included in the information that will be extracted as part of the graph-based features 108B.

Count features 108B1, also shown in FIG. 6, may relate to simple counts of information extracted from the nodes selected in the breadth-first search. In the example above where 200 nodes were included in the breadth-first search, a count feature 108B1 might be the number of those 200 nodes that are claims. In this example, 70 of the 200 nodes are claims. A second piece of information that may be extracted as a count feature 108B1 is the number of individuals associated with the target claim 604. In this example, there may be 8 individuals represented as nodes that are included within the parameters of the breadth-first search within the neighbourhood of nodes 602. Neighbourhood features 108B2 relate to information such as how many nodes within the parameters of the breadth-first search within the neighbourhood of nodes 602 are claims, the number of phone numbers included as nodes within the parameters of the breadth-first search that were created in the past year, the largest degree of connection within the pre-defined proximity within the neighbourhood of nodes 602, and how many nodes within the parameters of the breadth-first search are linked to fraud investigations with a high suspicion rating.

In the example above, the neighbourhood features 108B2 that may be extracted from the example of the 200 nodes are that the percentage of nodes in the neighbourhood of nodes 602 that are claims equals, e.g. 0.35. Another neighbourhood feature 108B2 that may be extracted is, in this example, the number of phone numbers included within the breadth-first search and created in the past year equals, e.g. 31.

Referring to FIGS. 2, 3, 4 and 7, tabular features 108C are extracted from both the current database 105 and the legacy database 106. Specifically, tabular features 108C are derived from the information contained in the insurance information table 113 which is itself an amalgamation of information from both the current database 105 and the legacy database 106. In at least some implementations, there are three forms of tabular features 108C: claim features 108C1, exposure features 108C2, and other features 108C3 (e.g. see also FIG. 8). In at least some implementations, the tabular features 108C are converted to a vector format for subsequent concatenation and combining with the text-based features 108A and graph based features 108B. For example, the tabular features may be represented as a feature set (tf1, tf2, tf3) whereby tf1 variable represents the claim based features 108C1, tf2 represents the exposure features 108C2 and tf3 the other remaining features 108C3.

At 306, operations of the computing device 102 configure the features 108 so that they can be used as inputs in the predictive machine learning model 112. Having extracted features 108 in the form of text-based features 108A, graph-based features 108B, and tabular features 108C in the form of vectors, the vectors are then combined and one combination vector is input into the predictive machine learning model 112.

Thus, in some implementations, the vector of features for a particular exposure (e.g. auto accident, bodily injury; property damage, residential incident or otherwise resulting in a claim) may be decomposed as (f1, f2, f3, f4) where f1 and f2 relates to claim based features 108C1 and exposure features 108C2 of the tabular features; f3 represents the vector of the text-based features 108A for the particular exposure and f4 is the vector of graph-based features 108B for the particular exposure.

In one example, the text-based features 108A extracted by process of text to vector representation (e.g. representing both manual and automatic features) may be the vector set="0.1, 2.3,−1.2,5,1,0". That is a sentence based description of a target claim (e.g. "All roads lead to Rome") may be converted to a vector (0.1, 2.3, −1.2) and combined with manual features representing the number of words=5; English=(1,0), etc. In this example, the graph-based features 108B extracted may be the vector set="0.5, 10" (e.g. a claim node connects 2 policies, 3 individuals, and 5 phone numbers having features of percentage of phones=0.5; number of neighbours=10, etc). Furthermore, the tabular features 108C extracted may be the vector set=(tf1, tf2, tf3). Where tf1, tf2, and tf3 are variables representing values for the claim based features 108C1, exposure features 108C2 and remaining features 108C3. After extraction these features 108 are all combined into one single vector string, for example, "(0.1, 2.3, −1.2, 5, 1, 0, 0.5, 10, tf1, tf2, tf3 . . . )". This vector string, consisting of three distinct fields of information extracted and synthesized into one common format, can then be input into the predictive machine learning model 112.

The predictive machine learning model 112, relying on a gradient boosting machine learning algorithm, uses the features 108 as inputs in order to assess whether, based on the circumstances of the target claim request 107, the target claim request 107 might be fraudulent.

The predictive machine learning model 112, may be trained previously based on a number of scenarios for current and past claims, claimants involved, policy, and investigative information input through prior set of features 108.

As an example, if the target claim request 107 relates to a home insurance claim based on an exposure involving a house fire, the predictive machine learning model 112 may produce a prediction that the target claim request 107 might be fraudulent by running a series of weak predictions based on the circumstances of the target claim request 107 in conjunction with the information derived from the features 108. The series of weak predictions will, when added together, provide a strong prediction as to whether the target claim request 107 might be fraudulent.

FIG. 4 is a diagram illustrating a process 400, in at least some implementations, by which the information communicated in the insurance information package 104 is distilled, extracted, and input into the predictive machine learning model 112 (e.g. via the text-based data processing module 214, the graph-based data processing module 216 and the tabular data processing module 218 of FIG. 2). Referring to FIGS. 1, 2, and 4, when the information is first communicated to the computing device 102 from the central server 103, it is in the form of the current database 105, containing a store of current policy information for insurance holders associated with an insurance provider, and the legacy database 106, containing a store of transaction information related to past insurance fraud investigations and results of the investigations. The computing device 102, via the information processing module 222 (see also FIG. 2), causes the information in the current database 105 and the legacy database 106 to be converted into the two modular tables 113 the insurance information table 113A and the edge table 1136. The insurance information table 113, containing current and past information relating to claims, claimants, and fraud investigations, includes information from both the current database 105 and the legacy database 106, and provides the information from which the features 108 are extracted. The edge table 1136 contains information from the current database 105 relating to the connections between claims with overlapping attributes, and is used only to extract the neighbourhood features 108B2.

Once all of the features 108 have been extracted from the two modular tables 113 they are all provided as inputs to the predictive machine learning model 112.

FIG. 5 is a diagram illustrating a text feature generation process 500, in accordance with at least one implementation, implemented by the computing device 102 of FIGS. 1, 2, 4 and 5, by which the text-based features 108A are extracted from communications relating to a target claim request 107. The target claim request 107 will arise when the requesting device 506 communicates with the endpoint device 508 containing information relating to the circumstances of the claim. This information communicated from the requesting device 506 to the endpoint device 508 is stored in the current database 105 in the form of a text-based description 502. The text-based description 502 is automatically communicated, as part of the insurance information package 104, to the computing device 102. The computing device 102, upon receiving the insurance information package 104, causes the text-based description 502 to be converted into a condensed description 504 that further distills the pertinent claim information related to the target claim request 107.

From this word breakdown, text-based features 108A are extracted in two forms: manual features 108A1, and automatic features 108A2. Manual features 108A1 include information such as the number of tokens, the number of relevant words to the claim, and the description length, amongst other aspects. The automatic features 108A2 are extracted through a process by which the condensed description 504 is automatically translated into an array of vectors (e.g. using a word to vector conversion process), where one vector is created for each word in the condensed description 504. Each vector has a number of dimensions, each dimension representing one semantic quality of the condensed description. The array of vectors may then be averaged in order to provide a feature representation (e.g. the feature vector set represented as: (f1, f2, f3, f4, . . . fn)) of the entire semantic properties of the text-based description 502.

FIG. 6 is a diagram illustrating a graph generation process 600 by which graph-based features 108B (e.g. see also FIGS. 1, 2, 4 and 6) are extracted from the current information database 105, and specifically from both the insurance information table 113A and the edge table 113B. Graph-based features 108B are extracted in two forms: a set of count features 108B1 and a set of neighbourhood features 108B2. The extraction process begins with the target claim request 107. Stored within the insurance information table 113A is information related to a plurality of both past and present claimants, claims and past fraud investigations. Target claim request 107 is represented as a target node 604 within the larger network. The graph from which the graph-based features 108B are derived is created by matching together different policies or claims with other policies or claims, and with entities including names, phone numbers, addresses, email addresses, and, in one example, vehicles based on the vehicle identification (VIN) number.

When connections are made between nodes within the graph, the nodes are connected via an edge 606. Edges 606 link nodes and also store information related to that linkage, including when the link was created.

In one example, the target node 604 may be connected to another node that represents a phone number, and that phone number node may also be connected to a separate claim node. This connection between the two nodes would indicate that the claims or policies defined by the node shared a phone number. In this example, node 604 might also be connected to a different policy through a shared email address associated with both the target claim request 107 underlying the target node 604 and underlying the policy associated with the other node. In another example, the target node 604 may be connected to another node that represents a policy based on a shared vehicle VIN number between both the target claim request 107, and the different policy. In all of these examples the various connected nodes would be connected via the edges 606 that included timestamps indicating when the connection was formed. In the first example, the connection between the target node 604 and the separate claim node would be forged when phone number began to become associated with either the target node 604 or the separate claim node, whichever was created most recently.

Once all of the claims, policies and entities have been represented as nodes within the current information database 105, and these nodes have been connected in the manner described above by edges 606, the resulting network is referred to as the neighbourhood of nodes 602. The computing device 102 then performs a breadth-first search in order to restrict the feature extraction to a subset of the neighbourhood of nodes 602 most closely connected to the target node 604. A breadth-first search consists of a first layer search whereby information is gathered from the nodes immediately connected to the target node 604 within the neighbourhood of nodes 602. A second layer search is then performed gathering information from all of the nodes immediately connected to those nodes that are themselves immediately connected to the target node 604. A pre-defined number of search layers are performed, for example, six layers of node connections extending from the target node 604, and the graph-based features 108B are extracted from resulting information.

Count features 108B1 are derived from the neighbourhood of nodes 602 by extracting information related to the number of claims in the neighbourhood of nodes 602, the number of claimants or individuals associated to one claim, and the node degree. For example, if the target node 604 represents the target claim request 107, and the target node 604 is connected to two nodes representing two separate policies, three separate email addresses, and five separate phone numbers, then some of the count features 108B1 extracted from the neighbourhood of nodes 602 could be that the percentage of phones equals 0.5, and the number of total neighbours equals 10, etc.

Neighbourhood features 108B2 are extracted from the information contained in the neighbourhood of nodes 602 and relate to information such as the percentage of nodes in the neighbourhood of nodes 602 that are claims, the max degree of connection between one node and another in the neighbourhood of nodes 602, the number of phone numbers connected to the claims or policies represented in the neighbourhood of nodes 602 within a select number of preceding years, and whether any claim in the neighbourhood of nodes 602 is connected to older claims that may have been investigated in the past with a high suspicion ranking. An example of a neighbourhood features 108B2 would be that the percentage of the number of nodes in the neighbourhood of nodes 602 equals 0.3.

Figure 7:
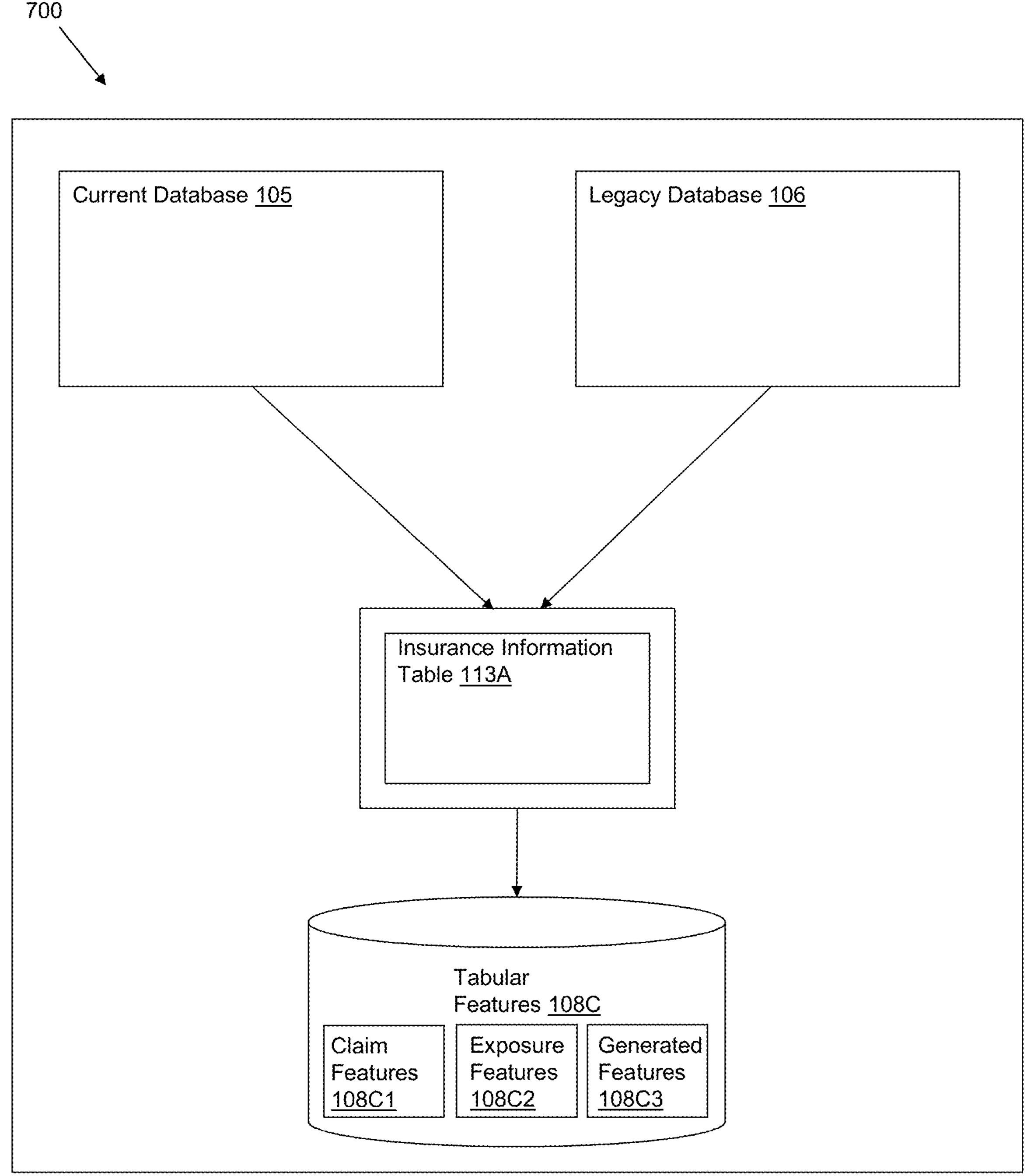
FIG. 7 is a flowchart illustrating example operations of portions of the computing device of FIG. 1 for generating tabular features, in accordance with one or more aspects of the present disclosure.
Figure 8:
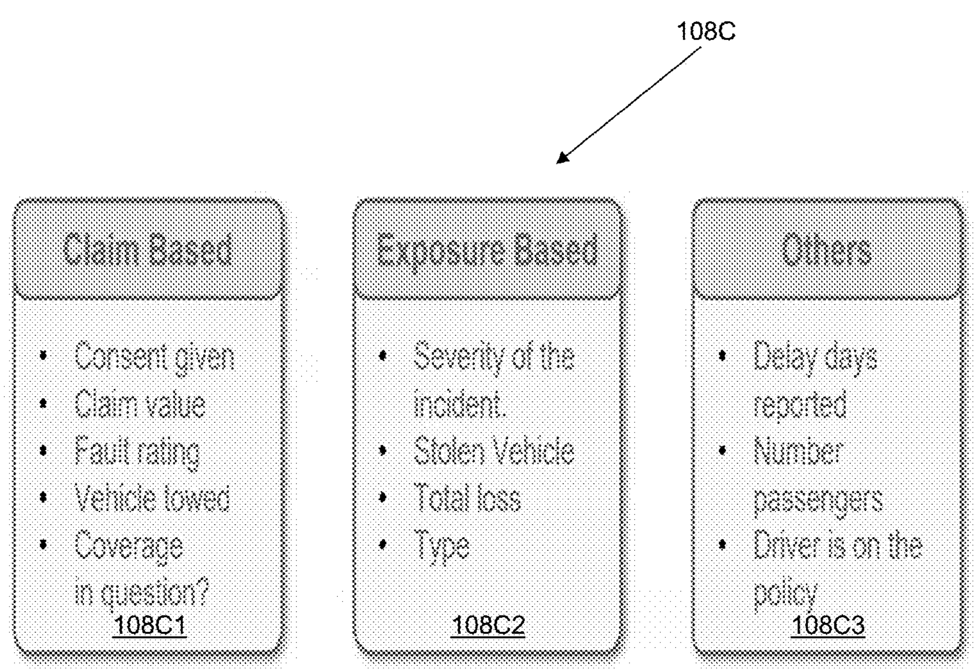
FIG. 8 is a table illustrating example tabular features as generated in the flowchart of FIG. 7.

FIG. 7 is a diagram illustrating the process, in at least some aspects, by which tabular features 108C are extracted from the insurance information package 104 (also referring to FIGS. 1, 2, and 4). Tabular features 108C are extracted directly from the insurance information table 113A. Tabular features 108C are extracted in three different forms: a set of claim features 108C1, a set of exposure features 108C2 and a set of generated features 108C3. FIG. 8 further illustrates examples of tabular features 108C shown as claim features 108C1, exposure features 108C2, and generated features 108C3.

Claim features 108C1 are extracted from information contained in the insurance information table 113A that relates to the target claim request 107. In one example, the target claim request 107 may be in relation to a home insurance claim. In this example the claim features 108C1 extracted might include information such as the value of the claim, the type of coverage in question, and the fault rating of the claimant connected to the claim. In another example, the target claim request 107 may be in relation to a vehicle insurance claim. In this example the claim features 108C1 extracted might include information such as the claim value, the type of coverage, the fault rating of the claimant, and whether or not the vehicle was towed.

Exposure features 108C2 are extracted from the information stored in the insurance information table 113A related to the circumstances of the exposure involved in target claim request 107. Information that might be extracted as part of the exposure features 108C2 are the severity of the incident, the total loss, and the type of exposure generally. In one example, the target claim request 107 might be related to a vehicle theft, in which case the fact that the vehicle was stolen would be extracted an exposure feature 108C2.

Generated features 108C3 are extracted from the information stored in the insurance information table 113A, whereupon the computing device 102 is caused to automatically generate a variety of new information points based on the relationship of other information stored within the insurance information table 113A, where this new generated information is extracted as generated features 108C3. Examples of new information points that may be generated from the existing insurance information table 113A and extracted as generated features 108C3 include the number of days between the policy creation and the reported exposure date, and, in the example of an vehicle insurance claim, the number of passengers in the vehicle at the time and whether or on the driver of the vehicle at the time of the exposure was on the policy.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Various embodiments of the invention have been described. These and other embodiments are within the scope of the following claims.

What is claimed is:

1. A computer system comprising:

a computing device;

a central server for detecting a fraudulent transaction in a customer account;

a requesting device;

an endpoint device;

a network for connecting the computing device, the central server, the requesting device, and the endpoint device, wherein the computing device has a processor coupled to a memory, the memory storing instructions, which when executed by the processor, configure the computing device to:

communicate with the central server via the network to receive from a current database containing a data store of current policy information for insurance holders associated with an insurance provider, an insurance information package comprising current transactions relating to a target claim for a claimant associated with the requesting device as requested from an entity associated with the endpoint device and past transactions for past claims including prior transactions flagged as fraudulent;

generate a set of text-based features derived from a plurality of descriptions of communications between the requesting device and the endpoint device when requesting the target claim from the entity, the text-based features describing the target claim, by automatically translating the descriptions of communication into an array of vectors, wherein a vector of the array is created for each word used in the description and having a number of dimensions, the array of vectors averaged to provide a representation of entire semantic properties of the description into vector-based features;

generate a set of graph-based features derived from the insurance information package relating to all claims, wherein each node identifies a particular claim selected from the target claim and the past claims and captures attributes of the particular claim and associated policy; each edge links two nodes based on one or more overlapping attributes; and the set of graph-based features:

generating a network graph and comprising two categories of features:

count features representing counts of information associated with a target node of the network graph, the target node being itself a representation of one insurance claimant, within a network of insurance claimant information, and neighbourhood features comprising information beyond the target node within the network of insurance claimant information comprising a neighbourhood of nodes surrounding the target node, wherein the neighbourhood features are derived via a breadth first search comprising:

gathering information from a set of neighbour nodes immediately connected to the target node, and repeating the gathering in an extended neighbour search for a set of extended neighbour nodes immediately connected to each of the neighbour nodes, and repeating the gathering again until at least a pre-defined number of extended neighbour searches have been performed from the target node;

generate a set of tabular features comprising details related to claim information and exposure details of the past claims and the target claim from both the current database containing the data store of current policy information for insurance holders associated with an insurance provider, and a legacy database containing the corresponding data store of transaction information related to past insurance fraud investigations, and where the tabular features comprise claim-based features; and generate a computer signal providing an indication of a likelihood of electronic fraudulent transaction in the current transactions for the target claim by applying the set of text-based features, the set of graph-based features and the set of tabular features as input into a predictive machine learning model using gradient boosted decision trees and responsive to the generation of the computer signal, to cause a computerized action for denying subsequent transactions from parties associated with the target claim comprising the requesting device to be triggered on the requesting device and generate an alert notification on affected devices processing the claims via the central server for triggering actions on the subsequent transactions, wherein the predictive machine learning model using gradient boosted decision trees is trained by:

collecting past insurance information packages from the legacy database containing a corresponding data store of the past claims;

generating the set of text-based features, the set of graph-based features and the set of tabular features from the past insurance information packages contained in the legacy database;

flagging each past claim within the past insurance information packages as one of: fraudulent or not fraudulent transaction;

creating a training data set comprising the set of text-based features, the set of graph-based features and the set of tabular features extracted from the past insurance information package and the past claims as flagged; and training the predictive machine learning model using the training set to predict and thereby generate the computer signal by producing a plurality of decision tree-based decisions with each new decision tree in the gradient boosted decision trees trained on residuals of previous decision trees.

2. The computer system of claim 1, wherein the instructions configure the computing device to first synthesize the insurance information package in the current database into two distinct tables prior to extracting the set of features, the two distinct tables comprising:

an insurance information table comprising: general insurance information relating to both present and past claimants, claims, and fraud investigations, and;

an edge table, consisting of information relating to connections between various claimants connected to the entity.

3. The computer system of claim 1, wherein the edge links the two nodes along with a timestamp indicating when a relationship between the two nodes started, the relationship for use by the predictive machine learning model in predicting the likelihood of fraud.

4. The computer system of claim 1, wherein the description is text-based and the set of text-based features generated further comprise at least one of: a total number of relevant words used in the description, a description length, a number of tokens defining text building blocks.

5. The computer system of claim 1, wherein the predictive machine learning model comprises a model using extreme gradient boosting.

6. A computer implemented method for detecting a fraudulent transaction in a customer account, the method comprising:

receiving via a network at an endpoint device a request related to a target claim from a requesting device for a claimant associated with the requesting device;

communicating via the network by a computing device with a central server to receive from a current database containing a data store of current policy information for insurance holders associated with an insurance provider an insurance information package comprising current transactions relating to the target claim for the claimant associated with the requesting device as requested from an entity associated with the endpoint device and past transactions for past claims including prior transactions flagged as fraudulent;

generating a set of text-based features derived from a plurality of descriptions of communications between the requesting device and the endpoint device when requesting the target claim from the entity, the text-based features describing the target claim, by automatically translating the descriptions of communication into an array of vectors, wherein a vector of the array is created for each word used in the description and having a number of dimensions, the array of vectors averaged to provide a representation of entire semantic properties of the description into vector-based features;

generating a set of graph-based features derived from the insurance information package relating to all claims, wherein each node identifies: a particular claim selected from the target claim and the past claims; and captures attributes of the particular claim and associated policy; each edge links two nodes based on one or more overlapping attributes; and the set of graph-based features:

generating a network graph and comprising two categories of features:

count features representing counts of information associated with a target node of the network graph, the target node being itself a representation of one insurance claimant, within a network of insurance claimant information, and neighbourhood features comprising information beyond the target node within the network of insurance claimant information comprising a neighbourhood of nodes surrounding the target node, wherein the neighbourhood features are derived via a breadth first search comprising:

gathering information from a set of neighbour nodes immediately connected to the target node, and repeating the gathering in an extended neighbour search for a set of extended neighbour nodes immediately connected to each of the neighbour nodes, and repeating the gathering again until at least a pre-defined number of extended neighbour searches have been performed from the target node;

generating a set of tabular features comprising details related to claim information and exposure details of the past claims and the target claim from both the current database containing the data store of current policy information for insurance holders associated with an insurance provider, and a legacy database containing the corresponding data store of transaction information related to past insurance fraud investigations, and where the tabular features comprise claim-based features; and generating a computer signal providing an indication of a likelihood of electronic fraudulent transaction in the current transactions for the target claim by applying the set of text-based features, the set of graph-based features and the set of tabular features as input into a predictive machine learning model using gradient boosted decision trees and responsive to the generation of the computer signal, to cause a computerized action for denying subsequent transactions from parties associated with the target claim comprising the requesting device to be triggered on the requesting device and generate an alert notification on affected devices processing the claims via the central server for triggering actions on the subsequent transactions, wherein the predictive machine learning model using gradient boosted decision trees is trained by:

collecting past insurance information packages from the legacy database containing a corresponding data store of the past claims;

generating the set of text-based features, the set of graph-based features and the set of tabular features from the past insurance information packages contained in the legacy database;

flagging each past claim within the past insurance information packages as one of: fraudulent or not fraudulent transaction;

creating a training data set comprising the set of text-based features, the set of graph-based features and the set of tabular features extracted from the past insurance information package and past claims as flagged; and training the predictive machine learning model using the training set to predict and thereby generate the computer signal by producing a plurality of decision tree-based decisions with each new decision tree in the gradient boosted decision trees trained on residuals of previous decision trees.

7. The method of claim 6, further comprising: first synthesizing the insurance information package in the current database into two distinct tables prior to extracting the set of features, the two distinct tables comprising:

an insurance information table comprising: general insurance information relating to both present and past claimants, claims, and fraud investigations; and an edge table, consisting of information relating to connections between various claimants connected to the entity.

8. The method of claim 6, wherein the edge links the two nodes along with a timestamp indicating when a relationship between the two nodes started, the relationship for use by the predictive machine learning model in predicting the likelihood of fraud.

9. The method of claim 6, wherein the description is text-based and the set of text-based features generated further comprise at least one of: a total number of relevant words used in the description, a description length, a number of tokens defining text building blocks.

10. The method of claim 6, wherein the predictive machine learning model comprises a model using extreme gradient boosting.

* * * * *